US012782233B2

(12) United States Patent
Ishikawa et al.

(10) Patent No.: US 12,782,233 B2
(45) Date of Patent: Nov. 3, 2026

(54) INSPECTION METHOD AND INSPECTION DEVICE OF OPTICAL FIBER RIBBON

(71) Applicant: SUMITOMO ELECTRIC INDUSTRIES, LTD., Osaka (JP)

(72) Inventors: Hiroki Ishikawa, Osaka (JP); Fumiaki Sato, Osaka (JP); Kenta Tsuchiya, Osaka (JP); Tatsuya Kuroki, Osaka (JP); Yoshiki Sonoyama, Osaka (JP); Reo Amano, Osaka (JP); Kenji Kawai, Osaka (JP); Kounan Shin, Osaka (JP); Satoshi Yoshikawa, Osaka (JP); Itaru Sakabe, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 112 days.

(21) Appl. No.: 18/899,086

(22) Filed: Sep. 27, 2024

(65) Prior Publication Data

US 2025/0110016 A1 Apr. 3, 2025

(30) Foreign Application Priority Data

Sep. 29, 2023 (JP) ................................ 2023-169692

(51) Int. Cl.
*G01M 11/08* (2006.01)
*G01M 11/02* (2006.01)

(52) U.S. Cl.
CPC ...... *G01M 11/088* (2013.01); *G01M 11/0207* (2013.01); *G01M 11/0257* (2013.01)

(58) Field of Classification Search
CPC ........... G01M 11/088; G01M 11/0207; G01M 11/0257; G01M 11/37; G01M 11/30; G01N 21/898; G01N 21/892
See application file for complete search history.

(56) References Cited

U.S. PATENT DOCUMENTS 5,458,830 A * 10/1995 Shin ...................... G01B 21/08 425/141
2017/0285258 A1* 10/2017 Kokura ............. G02B 6/02042
(Continued)

FOREIGN PATENT DOCUMENTS

| | | |
|---|---|---|
| JP | 2002-304922 A | 10/2002 |
| JP | 2012-042354 A | 3/2012 |
| JP | 2017-125780 A | 7/2017 |

OTHER PUBLICATIONS

Hashimoto et al "Evaluation Method for Surface Shape of Split Die Tape Type Optical Fiber Core", Apr. 28, 2000, JP2000121493 A (Year: 2000).*
(Continued)

*Primary Examiner* — Sang H Nguyen
(74) *Attorney, Agent, or Firm* — McDonald Hopkins LLC

(57) ABSTRACT

An inspection method of an optical fiber ribbon where a plurality of optical fibers are intermittently connected in a longitudinal direction through a connecting resin in a state where the optical fibers are arranged in parallel, the inspection method includes a step of irradiating a surface of the optical fiber ribbon where the connecting resin is provided with light from a light source while causing the optical fiber ribbon to travel in the longitudinal direction, and causing an imaging device to acquire an image based on reflected light that is emitted from the light source and reflected from the surface; and a step of detecting a position of the connecting resin based on the image.

13 Claims, 10 Drawing Sheets

(56) References Cited

U.S. PATENT DOCUMENTS

| | | | | |
|---|---|---|---|---|
| 2017/0299830 | A1* | 10/2017 | Kokura | G02B 6/02042 |
| 2019/0025156 | A1* | 1/2019 | Takahashi | G01M 11/37 |
| 2021/0191061 | A1* | 6/2021 | Isaji | C03C 25/326 |
| 2023/0152170 | A1* | 5/2023 | Nakamura | G01L 3/00 |
| | | | | 73/862.624 |

OTHER PUBLICATIONS

Takahashi et al "Inspection Method, Manufacturing Method and Inspection Device for Intermittent Type Optical Fiber Tape Core", May 22, 2014, JP2014095560 A (Year: 2014).*

* cited by examiner

INSPECTION METHOD AND INSPECTION DEVICE OF OPTICAL FIBER RIBBON

CROSS-REFERENCE TO RELATED APPLICATION

This application claims priority from Japanese Patent Application No. 2023-169692, filed on Sep. 29, 2023, the entire subject matter of which is incorporated herein by reference.

TECHNICAL FIELD

The present disclosure relates to an inspection method and an inspection device of an optical fiber ribbon.

BACKGROUND

JP2012-042354A discloses an inspection method of an intermittently connected optical fiber ribbon in which the length or the like of a non-connecting portion between connecting portions is measured. In this inspection method, the optical fiber ribbon is supported by a guide roller including a step portion to separate the non-connecting portion, an image of the optical fiber ribbon is acquired by a camera, and an edge interval, the number of edges, and the like are measured from the image.

JP2017-125780A discloses an inspection method of an intermittently connected optical fiber ribbon in which one-dimensional images in a width direction of the optical fiber ribbon are acquired by a camera and a two-dimensional image is generated by accumulating the one-dimensional images, and a connecting portion is inspected from the two-dimensional image. In this inspection method, the optical fiber ribbon is disposed between the camera and an illuminating device, illumination light (leakage light) is detected through the optical fiber ribbon, and a light intensity distribution along the width direction is measured. In addition, the optical fiber ribbon is supported by a guide roller including a step portion to separate the non-connecting portion.

JP2002-304922A discloses an inspection method of a flat cable in which a transmission image of the flat cable is acquired by a CCD camera to inspect a conduction and insulation coating state along a longitudinal direction of the flat cable.

SUMMARY

When the intermittently connected optical fiber ribbon is inspected using transmitted light as described above, a connecting resin is a transparent resin, and light is likely to transmit through the connecting resin. Therefore, it is difficult to acquire a high-contrast image where the connecting resin is distinguishable. In addition, when the non-connecting portion is separated using the guide roller such that an image of the non-connecting portion is likely to be acquired, unless optical fibers are reliably spaced from each other by the non-connecting portion, it is difficult to detect the non-connecting portion from the image. In particular, when a traveling speed of the optical fiber ribbon increases, the optical fiber ribbon may float from the guide roller due to vibration thereof, and there are portions where the effect of a step or a protrusion is removed.

The present disclosure provides an inspection method and an inspection device of an optical fiber ribbon in which a position of a connecting resin can be accurately detected.

An embodiment of the present disclosure provides an inspection method of an optical fiber ribbon where a plurality of optical fibers are intermittently connected in a longitudinal direction through a connecting resin in a state where the optical fibers are arranged in parallel, the inspection method including:

a step of irradiating a surface of the optical fiber ribbon where the connecting resin is provided with light from a light source while causing the optical fiber ribbon to travel in the longitudinal direction, and causing an imaging device to acquire an image based on reflected light that is emitted from the light source and reflected from the surface; and a step of detecting a position of the connecting resin based on the image.

According to the present disclosure, it is possible to provide an inspection method and an inspection device of an optical fiber ribbon in which a position of a connecting resin can be accurately detected.

DESCRIPTION OF EMBODIMENTS

Description of Embodiment of Present Disclosure

Figure 1:
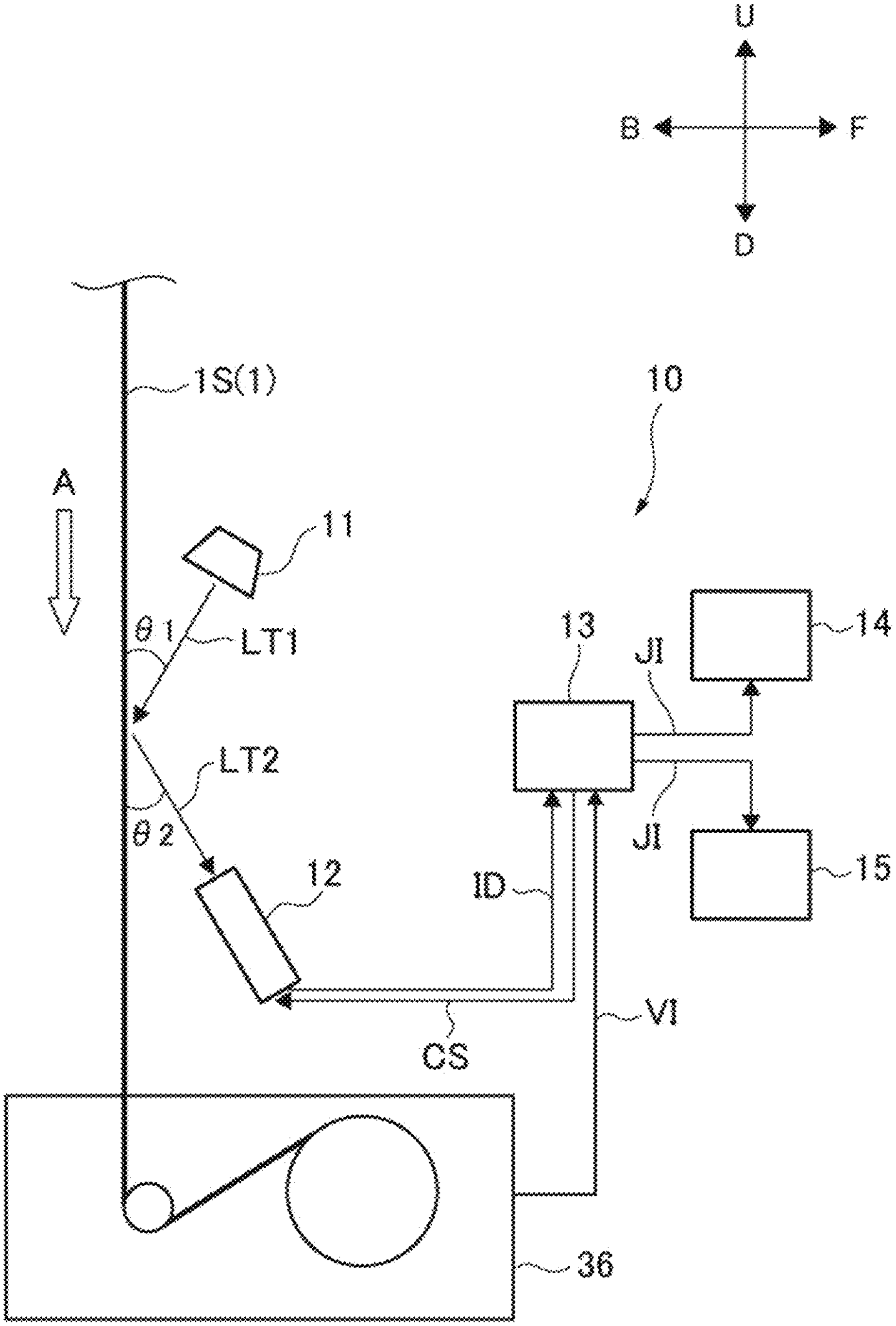
FIG. 1 is a schematic diagram illustrating a configuration of an inspection device of an optical fiber ribbon according to an embodiment.

First, aspects of the present disclosure will be described.

(1) A manufacturing method of an optical fiber ribbon according to the present disclosure is an inspection method of an optical fiber ribbon where a plurality of optical fibers are intermittently connected in a longitudinal direction through a connecting resin in a state where the optical fibers are arranged in parallel, the inspection method including:

a step of irradiating a surface of the optical fiber ribbon where the connecting resin is provided with light from a light source while causing the optical fiber ribbon to travel in the longitudinal direction, and causing an imaging device to acquire an image based on reflected light that is emitted from the light source and reflected from the surface; and a step of detecting a position of the connecting resin based on the image.

In the optical fibers adjacent to each other, a shape of the surface of the optical fiber ribbon varies between a portion where the connecting resin is present and a portion where the connecting resin is not present. For example, in the portion where the connecting resin is present, the intensity of reflected light locally increases. In the above-described method, the connecting resin is detected using the image based on the reflected light. Therefore, even when the connecting resin is transparent, an image having a high contrast of reflected light between the portion where the connecting resin is present and the portion where the connecting resin is not present can be acquired. As a result, the position of the connecting resin can be accurately detected.

(2) The inspection method of the optical fiber ribbon according to (1), may further include a step of determining whether the detected position of the connecting resin is normal.

With the above-described method, an abnormality such as deviation of a disposition, a size, or a shape of the connecting resin from a predetermined range can be detected.

(3) In the inspection method of the optical fiber ribbon according to (1) or (2), an imaging period T [ms] of the imaging device may be set such that the imaging period T, a length L [mm] of an imaging range in the longitudinal direction of the imaging device, and a traveling speed V [m/min] of the optical fiber ribbon satisfy a relational expression of $T<L/(V/60)$.

In the above-described method, an i-th (i represents a natural number other than zero) acquired image and an i+1-th acquired image partially overlap each other in the longitudinal direction of the optical fiber ribbon. Therefore, the optical fiber ribbon can be closely inspected over the entire length.

(4) In the inspection method of the optical fiber ribbon according to (3), when an overlapping width α [mm] in the longitudinal direction of imaging ranges imaged before and after the imaging period T is set to a constant, the imaging period T may be changed depending on the traveling speed V of the optical fiber ribbon such that a relational expression of $T=(L-\alpha)/(V/60)$ is satisfied.

In the above-described method, the overlapping width of the images acquired before and after the imaging period T is fixed. Therefore, even when the traveling speed V of the optical fiber ribbon changes, the position of the connecting resin is easily detected.

(5) In the inspection method of the optical fiber ribbon according to any one of (1) to (4), the imaging device may be disposed such that a first angle between the surface and incidence light emitted from the light source and incident on the surface and a second angle between the surface and reflected light reflected from the surface and incident on the imaging device are the same.

In the above-described method, specularly reflected light is incident on the imaging device. Therefore, in the optical fibers adjacent to each other, a contrast of reflected light intensity between the connecting resin and other portions is high.

(6) In the inspection method of the optical fiber ribbon according to (5), the second angle may be 25° or more and 35° or less.

When the second angle is less than 25°, there is a case where specularly reflected light does not enter the imaging device due to small vibration of the optical fiber ribbon. On the other hand, when the second angle is more than 35°, scattered light other than specularly reflected light also enters the imaging device. Therefore, in the optical fibers adjacent to each other, a contrast of reflected light intensity between the connecting resin and other portions is low. In the above-described method, the second angle is 25° or more and 35° or less, and the connecting resin is easily detected.

(7) In the inspection method of the optical fiber ribbon according to any one of (1) to (6), in the step of detecting the position of the connecting resin, a portion having a higher intensity of reflected light between the optical fibers adjacent to each other than forward and backward portions in the longitudinal direction may be determined to be a portion where the connecting resin is formed.

The connecting resin is formed on a depression between the optical fibers adjacent to each other. Therefore, in the optical fibers adjacent to each other, the intensity of reflected light in the portion where the connecting resin is present locally increases. In the above-described method, the connecting resin is detected based on the contrast of reflected light intensity between the optical fibers adjacent to each other. Therefore, a complicated process is unnecessary. As a result, the inspection of the optical fiber ribbon can be rapidly executed, and the inspection can be executed on the optical fiber ribbon traveling at a high speed.

(8) In the inspection method of the optical fiber ribbon according to any one of (1) to (7), the optical fiber ribbon may include a plurality of sub-ribbons each of which includes two optical fibers and a coating resin that continuously covers a periphery of the two optical fibers in the longitudinal direction, and in a state where the sub-ribbons are arranged in parallel, the sub-ribbons adjacent to each other may be intermittently connected to each other in the longitudinal direction through the connecting resin.

In the above-described method, even in a two-core intermittent optical fiber ribbon, the position of the connecting resin can be accurately detected. In the two-core intermittent optical fiber ribbon, the plurality of sub-ribbons are intermittently connected. Therefore, the flexibility of the optical fiber ribbon can be improved, and the optical fiber ribbon can be accommodated in an optical cable with high density. In addition, the optical fibers are integrated in each of the sub-ribbons. Therefore, when the plurality of optical fibers configuring the optical fiber ribbon are collectively spliced, easy handling can be implemented.

(9) A manufacturing device of an optical fiber ribbon according to the present disclosure is an inspection device of an optical fiber ribbon where a plurality of optical fibers are intermittently connected in a longitudinal direction through a connecting resin in a state where the optical fibers are arranged in parallel, and the inspection device may include:

a light source configured to irradiate a surface of the optical fiber ribbon where the connecting resin is provided with light, the optical fiber ribbon traveling in the longitudinal direction;

an imaging device configured to acquire an image based on reflected light that is emitted from the light source and reflected from the surface; and a control device configured to detect a position of the connecting resin based on the image.

In the optical fibers adjacent to each other, a shape of a surface of the optical fiber ribbon varies between a portion where the connecting resin is present and a portion where the connecting resin is not present. For example, in the portion where the connecting resin is present, the intensity of reflected light locally increases. In the above-described configuration, the connecting resin is detected using the image based on the reflected light. Therefore, even when the connecting resin is transparent, an image having a high contrast of reflected light between the portion where the connecting resin is present and the portion where the connecting resin is not present can be acquired. As a result, the position of the connecting resin can be accurately detected.

(10) In the inspection device of the optical fiber ribbon according to (9), the control device may determine whether the detected position of the connecting resin is normal.

With the above-described configuration, an abnormality such as deviation of a disposition, a size, or a shape of the connecting resin from a predetermined range can be detected.

(11) In the inspection device of the optical fiber ribbon according to (9) or (10), the imaging device may be disposed such that a first angle between the surface and incidence light emitted from the light source and incident on the surface and a second angle between the surface and reflected light reflected from the surface and incident on the imaging device are the same.

In the above-described configuration, specularly reflected light is incident on the imaging device. Therefore, in the optical fibers adjacent to each other, a contrast of reflected light intensity between the connecting resin and other portions is high.

(12) In the inspection device of the optical fiber ribbon according to (11), the second angle may be 25° or more and 35° or less.

When the second angle is less than 25°, there is a case where specularly reflected light does not enter the imaging device due to small vibration of the optical fiber ribbon. On the other hand, when the second angle is more than 35°, scattered light other than specularly reflected light also enters the imaging device. Therefore, in the optical fibers adjacent to each other, a contrast of reflected light intensity between the connecting resin and other portions is low. In the above-described method, the second angle is 25° or more and 35° or less, and the connecting resin is easily detected.

(13) In the inspection device of the optical fiber ribbon according to any one of (9) to (12), the control device may determine that a portion having a higher intensity of reflected light between the optical fibers adjacent to each other than forward and backward portions in the longitudinal direction is a portion where the connecting resin is formed.

The connecting resin is formed on a depression between the optical fibers adjacent to each other. Therefore, in the optical fibers adjacent to each other, the intensity of reflected light in the portion where the connecting resin is present locally increases. In the above-described method, the connecting resin is detected based on the contrast of reflected light intensity between the optical fibers adjacent to each other. Therefore, a complicated process is unnecessary. As a result, the inspection of the optical fiber ribbon can be rapidly executed, and the inspection can be executed on the optical fiber ribbon traveling at a high speed.

Details of Embodiment of Present Disclosure

A specific example of the inspection method and the inspection device of the optical fiber ribbon according to the present disclosure will be described with reference to the drawings. The present invention is not limited to these examples and is intended to include any modifications within the scope and meaning equivalent to the terms of the claims.

In the drawings, an arrow U represents an upward direction of a structure illustrated in the drawing. An arrow D represents a downward direction of the structure illustrated in the drawing. An arrow F represents a forward direction of the structure illustrated in the drawing. An arrow B represents a backward direction of the structure illustrated in the drawing. An arrow R represents a right direction of the structure illustrated in the drawing. An arrow L represents a left direction of the structure illustrated in the drawing. These directions are relative directions set for an inspection device 10 of an optical fiber ribbon illustrated in FIG. 1.

Inspection Device of Optical Fiber Ribbon

FIG. 1 is a schematic diagram illustrating a configuration of the inspection device 10 of an optical fiber ribbon 1 according to the present embodiment. The inspection device 10 is a device used for inspecting the optical fiber ribbon 1 where a plurality of optical fibers are intermittently connected in a longitudinal direction through a connecting resin in a state where the optical fibers are arranged in parallel.

Figure 2:
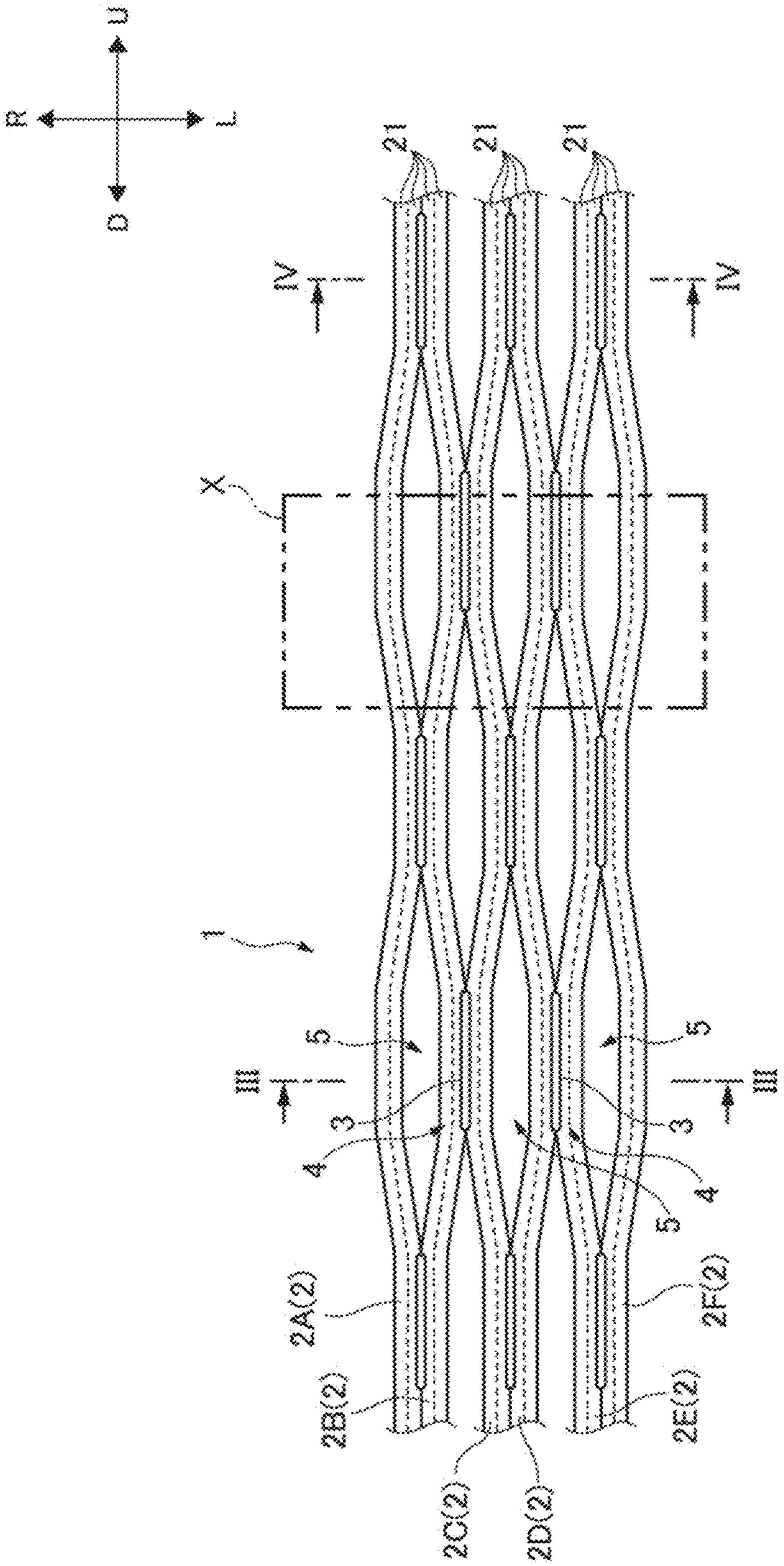
FIG. 2 is a plan view illustrating a configuration of the optical fiber ribbon.
Figure 3:
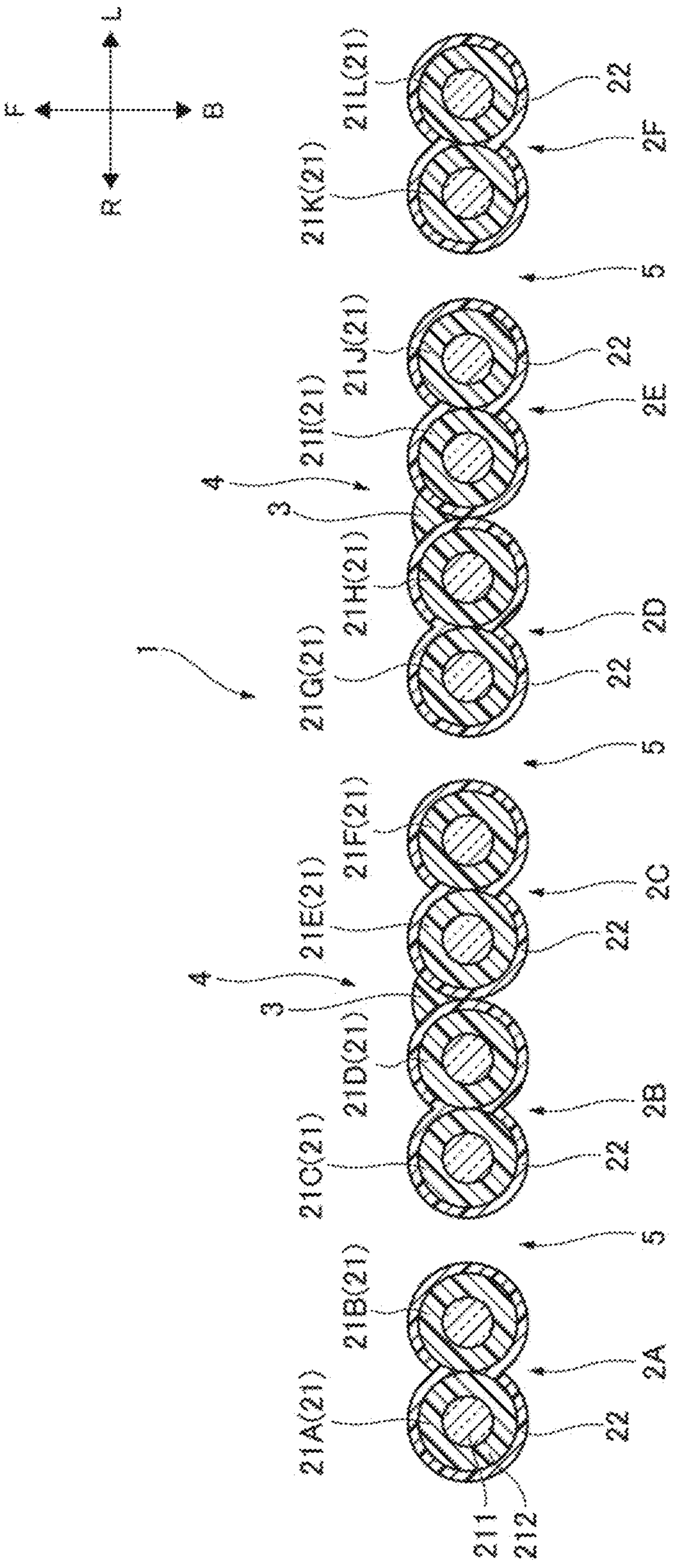
FIG. 3 is a cross-sectional view illustrating a configuration of a cross-section taken along line III-III in FIG. 2 when seen from an arrow direction.
Figure 4:
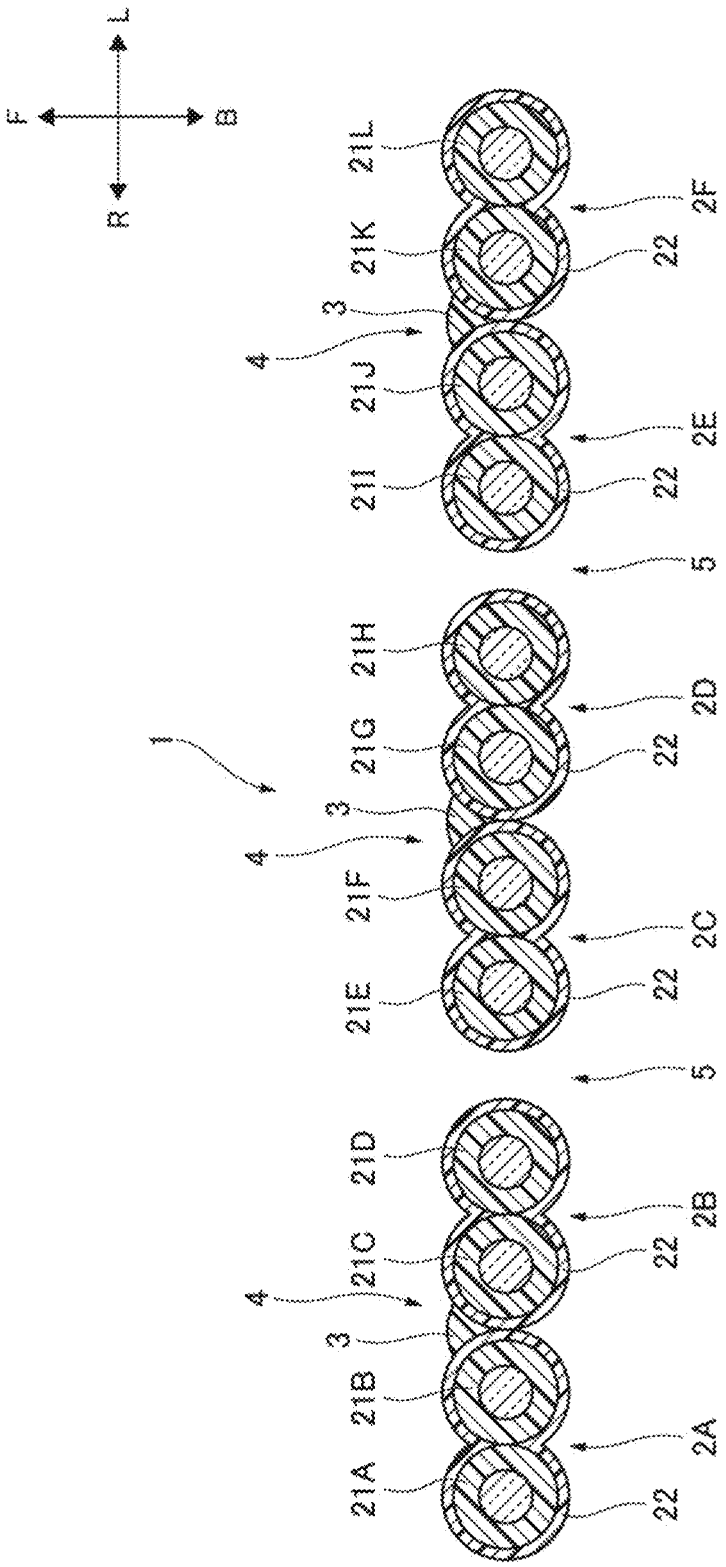
FIG. 4 is a cross-sectional view illustrating a configuration of a cross-section taken along line IV-IV in FIG. 2 when seen from an arrow direction.

FIG. 2 illustrates an example of the optical fiber ribbon 1. FIG. 2 illustrates the optical fiber ribbon 1 in a state where non-connecting portions 5 are widened in an arrangement direction of optical fibers 21. FIGS. 3 and 4 illustrate a cross-sectional shape of the optical fiber ribbon 1 of FIG. 2.

As illustrated in FIG. 2, the optical fiber ribbon 1 includes the plurality of optical fibers 21. As illustrated in FIG. 3, each of the optical fibers 21 includes a glass fiber 211 and a coating layer 212. The glass fiber 211 is formed of, for example, a core and a cladding. The coating layer 212 covers the periphery of the glass fiber 211. The coating layer 212 is formed of one or a plurality of coating layers. The coating layer 212 may include a colored layer that is colored with a predetermined color as the outermost layer.

The two optical fibers 21 adjacent to each other are integrated by a coating resin 22 in a state where the two optical fibers are continuously in contact with each other in the longitudinal direction, and thus a sub-ribbon 2 is formed. The coating resin 22 covers the periphery of the two optical fibers 21 adjacent to each other in the longitudinal direction. The coating resin 22 is formed of, for example, a resin material such as an acrylic ultraviolet curable resin or an epoxy ultraviolet curable resin. The coating resin 22 is, for example, a transparent resin.

As illustrated in FIG. 2, the plurality of sub-ribbons 2 are intermittently connected in the longitudinal direction through a connecting resin 3 in a state where the sub-ribbons are arranged in parallel. As a result, in the optical fiber ribbon 1, a connecting portions 4 where the sub-ribbons 2 adjacent to each other are connected through the connecting resin 3 and the non-connecting portions 5 where the sub-ribbons 2 adjacent to each other are not connected are intermittently provided in the longitudinal direction. The connecting resin 3 is formed of, for example, a resin material such as an acrylic ultraviolet curable resin or an epoxy ultraviolet curable resin. The connecting resin 3 is, for example, a transparent resin. The connecting resin 3 may be formed of the same resin material as the coating resin 22.

In the present example, as illustrated in FIGS. 3 and 4, the optical fiber ribbon 1 includes 12 optical fibers 21A to 21L, and the two optical fibers 21 adjacent to each other (21A and 21B, 21C and 21D, 21E and 21F, 21G and 21H, 21I and 21J, 21K and 21L) form the sub-ribbons 2 (2A, 2B, 2C, 2D, 2E, 2F).

The inspection of the optical fiber ribbon 1 by the inspection device 10 is executed, for example, in a step of manufacturing the optical fiber ribbon 1.

Figure 5:
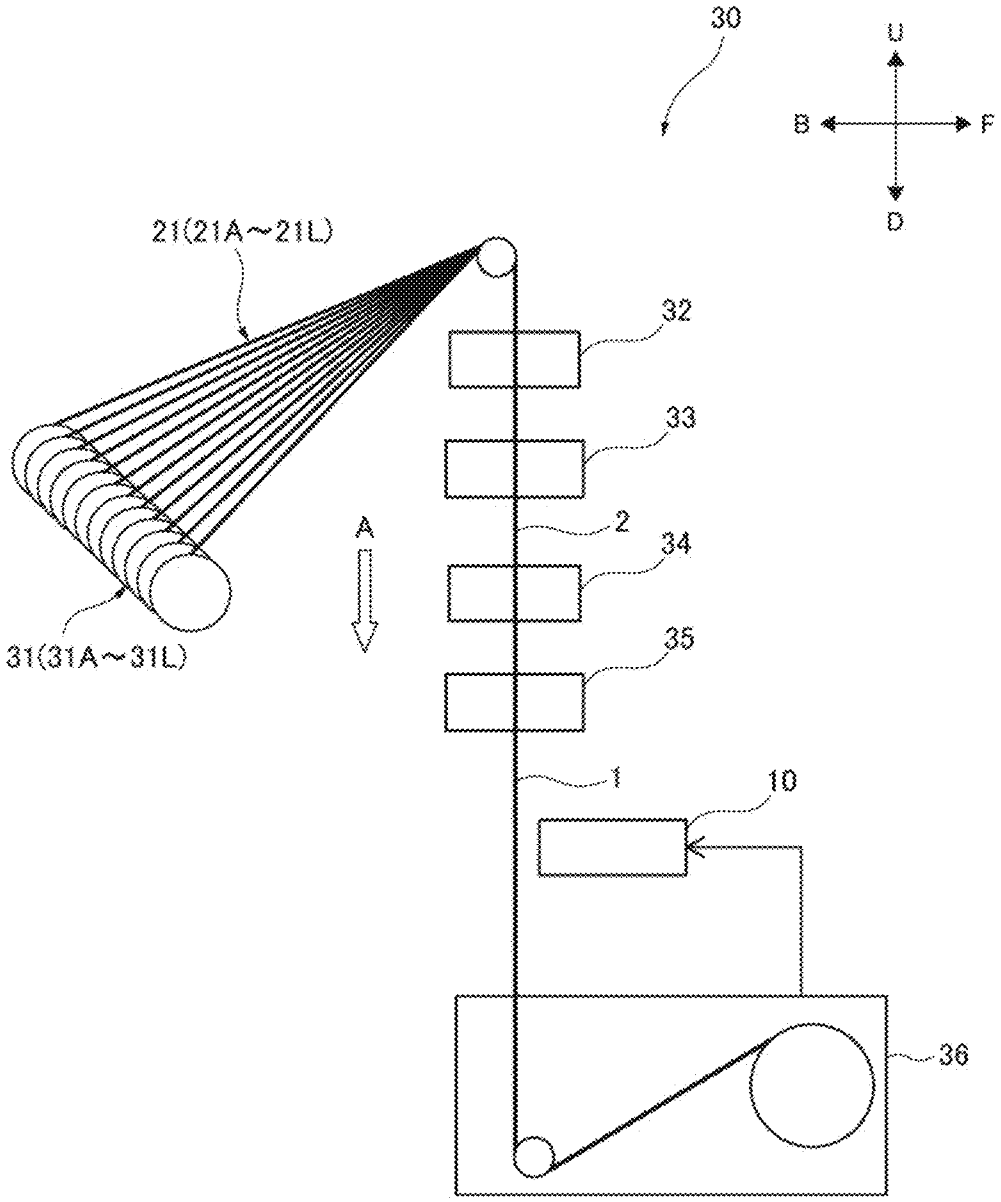
FIG. 5 is a schematic diagram illustrating a configuration of a manufacturing device of an optical fiber ribbon into which the inspection device is incorporated.

FIG. 5 illustrates a configuration of a manufacturing device 30 of the optical fiber ribbon 1 into which the inspection device 10 is incorporated. The inspection device 10 is configured to inspect the optical fiber ribbon 1 formed by the manufacturing device 30.

Specifically, the manufacturing device 30 includes a supply bobbin 31, a first application device 32, a first curing device 33, a second application device 34, a second curing device 35, and a winding-up machine 36.

The optical fibers 21A to 21L wound around supply bobbins 31A to 31L are drawn out and transported to the first application device 32. In the first application device 32, the coating resin 22 is applied to the periphery of the two optical fibers 21 adjacent to each other among the plurality of optical fibers 21A to 21L. Next, the coating resin 22 applied to the periphery of the optical fibers 21 is cured, for example, by ultraviolet irradiation in the first curing device 33. As a result, the plurality of sub-ribbons 2 where the two optical fibers 21 are integrated by the coating resin 22 are formed.

Next, the plurality of sub-ribbons 2 are transported to the second application device 34 in a state where the sub-ribbons are arranged in parallel. In the second application device 34, the connecting resin 3 is applied between the sub-ribbons 2 adjacent to each other. Next, the connecting resin 3 applied between the sub-ribbons 2 adjacent to each other is cured, for example, by ultraviolet irradiation in the second curing device 35. As a result, the optical fiber ribbon 1 where the plurality of sub-ribbons 2 are intermittently connected in the longitudinal direction through the connecting resin 3 is formed. The optical fiber ribbon 1 is wound up around the winding-up machine 36. The operation of each of the devices is controlled by an intermittent application control device (not illustrated).

In the present example, the optical fibers 21A to 21L drawn out from the supply bobbins 31A to 31L travel in the downward direction (direction indicated by the arrow A in the drawing), and form the optical fiber ribbon 1 in a state where the optical fibers 21A to 21L are arranged in a direction (horizontal direction in the drawing) orthogonal to the paper plane of FIG. 5. In the present example, the optical fiber ribbon 1 travels such that the longitudinal direction thereof is along the vertical direction.

The inspection device 10 is disposed between the second curing device 35 and the winding-up machine 36, and determines whether a position where the connecting resin 3 is formed in the optical fiber ribbon 1 traveling in the downward direction from the second curing device 35 is normal.

Specifically, as illustrated in FIG. 1, the inspection device 10 includes a light source 11, an imaging device 12, and a camera control device 13. The camera control device 13 corresponds to the control device according to the present disclosure.

The light source 11 is configured to irradiate a surface 1S of the optical fiber ribbon 1 where the connecting resin 3 is provided with light, the optical fiber ribbon 1 traveling in the longitudinal direction. The light source 11 emits, for example, white light. The surface 1S includes a certain amount of unevenness, but it is assumed that the surface 1S is a flat surface where the unevenness is leveled off.

In a cross-section along the longitudinal direction and perpendicular to the surface 1S of the optical fiber ribbon 1 where the connecting resin 3 is provided, the light source 11 is disposed to emit light in a direction having a first angle θ1 with respect to the surface of the optical fiber ribbon 1 where the connecting resin 3 is provided. In other words, the first angle θ1 is an angle between the surface 1S of the optical fiber ribbon 1 where the connecting resin 3 is provided and incidence light LT1 that is emitted from the light source 11 and is incident on the surface 1S of the optical fiber ribbon 1 where the connecting resin 3 is provided. The first angle θ1 is set to be, for example, 25° or more and 35° or less.

The imaging device 12 is configured to acquire an image based on reflected light that is emitted from the light source 11 and is reflected from the surface 1S of the optical fiber ribbon 1 where the connecting resin 3 is provided. The imaging device 12 is, for example, a CMOS camera.

In the cross-section along the longitudinal direction and perpendicular to the surface of the optical fiber ribbon 1 where the connecting resin 3 is provided, the imaging device 12 is disposed such that light reflected from the surface of the optical fiber ribbon 1 where the connecting resin 3 is provided in a direction having a second angle θ2 with respect to the surface 1S of the optical fiber ribbon 1 where the connecting resin 3 is provided is incident. In other words, the second angle θ2 is an angle between the surface 1S of the optical fiber ribbon 1 where the connecting resin 3 is provided and reflected light LT2 that is emitted from the light source 11 and is incident on the imaging device 12.

The second angle θ2 is set to be, for example, the same angle as the first angle θ1. "The second angle θ2 being the same as the first angle θ1" is not limited to a case where the second angle θ2 is set to be completely the same as the first angle θ1 and includes a case where the second angle θ2 is set in a range where a certain amount of error is allowable. The second angle θ2 is, for example, 25° or more and 35° or less.

Figure 6:
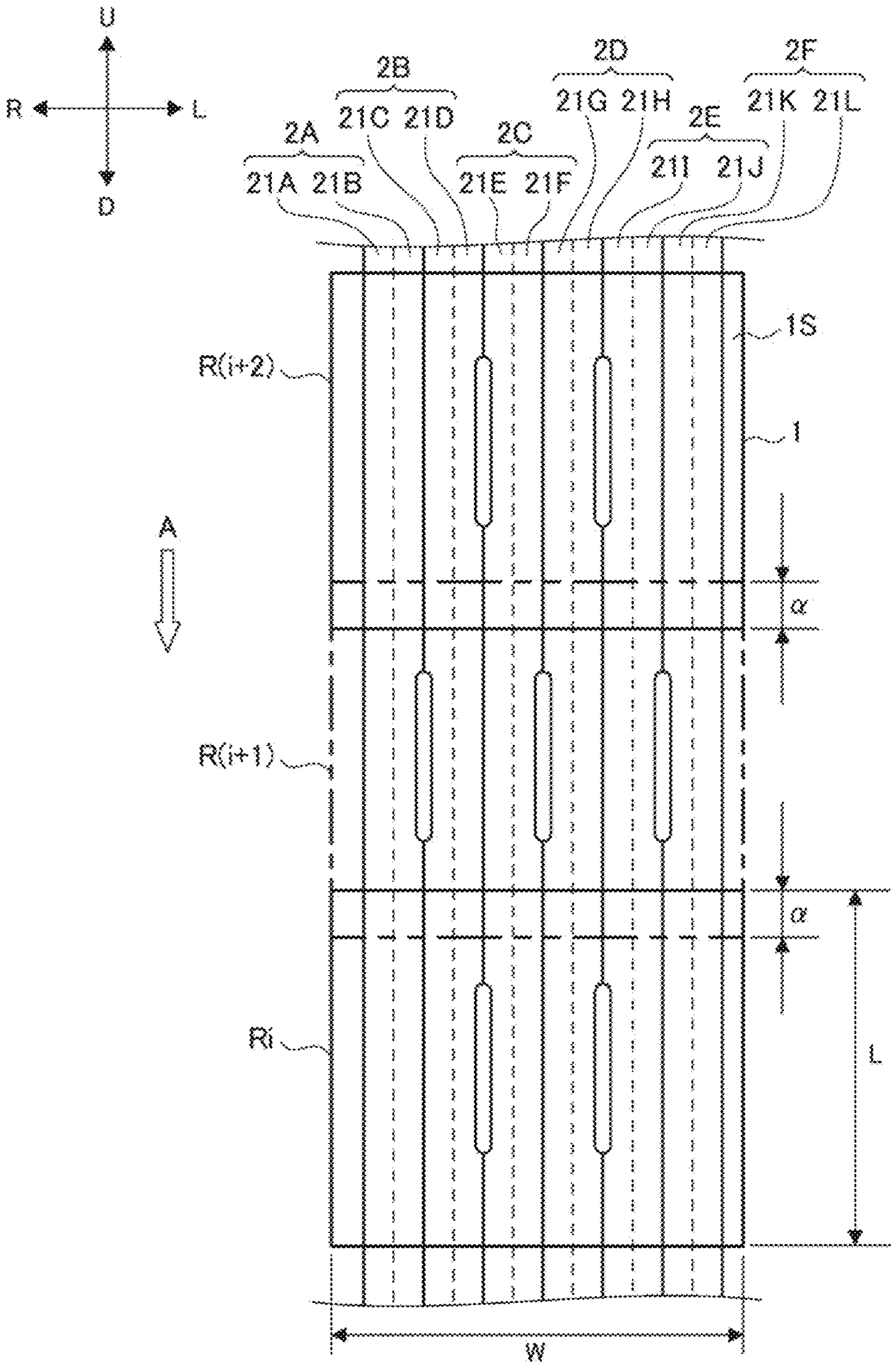
FIG. 6 is a diagram illustrating an imaging range (field of view) of an imaging device for a surface of the optical fiber ribbon.

The imaging device 12 periodically acquires an image from the optical fiber ribbon 1 traveling in the longitudinal direction. FIG. 6 illustrates an imaging range (field of view) of the imaging device 12 for the surface 1S of the optical fiber ribbon 1 where the connecting resin 3 is formed. In FIG. 6, Ri represents an i-th imaging range, R(i+1) represents an i+1-th imaging range, and R(i+2) represents an i+2-th imaging range. i represents a natural number other than zero. Each of the imaging ranges is defined by the length L [mm] in the longitudinal direction of the optical fiber ribbon 1 and a length W [mm] in a width direction of the optical fiber ribbon 1.

An imaging period of the imaging device 12 is set such that, for example, imaging ranges (for example, Ri and R(i+1) or R(i+1) and R(i+2)) imaged before and after the imaging period partially overlap each other. Specifically, for example, assuming that the imaging period is represented by T [ms], the length of the imaging range in the longitudinal direction of the optical fiber ribbon 1 is represented by L [mm], and a traveling speed of the optical fiber ribbon 1 is represented by V [m/min], the imaging period Tis set such that a relational expression of $T<L/(V/60)$ is satisfied.

Alternatively, assuming that an overlapping width in the longitudinal direction of the imaging ranges imaged before and after the imaging period T is represented by $\alpha$ [mm], when the overlapping width $\alpha$ is set to a constant, the imaging period T may be set to be changed depending on the traveling speed V of the optical fiber ribbon 1 such that a relational expression of $T=(L-\alpha)/(V/60)$ is satisfied. The overlapping width $\alpha$ is set such that, for example, a relational expression of $0.1<\alpha/L<0.5$ is satisfied.

Referring back to FIG. 1, the camera control device 13 is, for example, a general-purpose computer including: a general-purpose memory; and a general-purpose microprocessor that operates in cooperation with the general-purpose memory.

The camera control device 13 is configured to control the operation of the imaging device 12. For example, the camera control device 13 determines the imaging period T of the imaging device 12 based on the overlapping width $\alpha$ of the imaging ranges, the length L of the imaging range, and the traveling speed V of the optical fiber ribbon 1. The camera control device 13 outputs a control signal CS for executing imaging in the determined imaging period T to the imaging device 12. The imaging device 12 sets or changes the imaging period T based on the control signal CS. The camera control device 13 is connected to, for example, the winding-up machine 36, and acquires information VI regarding a winding-up speed of the optical fiber ribbon 1 as information regarding the traveling speed V of the optical fiber ribbon 1 from the winding-up machine 36.

In addition, the camera control device 13 acquires a data ID of an image where the optical fiber ribbon 1 is imaged from the imaging device 12. The camera control device 13 detects the position of the connecting resin 3 based on the acquired image. The camera control device 13 determines whether the detected position of the connecting resin 3 is normal. For example, when a disposition, a size, and a shape of the connecting resin 3 is in predetermined ranges, the camera control device 13 determines that the position of the connecting resin 3 is normal. On the other hand, when at least one of the disposition, the size, and the shape of the connecting resin 3 is not in the predetermined range, the camera control device 13 determines that the position of the connecting resin 3 is not normal. The predetermined ranges are set in a range where errors in the set disposition, the set size, and the set shape of the connecting resin 3 are allowable.

the camera control device 13 outputs the determination result of the position of the connecting resin 3. For example, the inspection device 10 includes a display device 14 and a storage device 15. The camera control device 13 outputs the determination result JI of the position of the connecting resin 3 to the display device 14, and causes the display device 14 to display the determination result of the position of the connecting resin 3. In addition, the camera control device 13 outputs the determination result JI of the position of the connecting resin 3 to the storage device 15, and stores the determination result of the position of the connecting resin 3 in the storage device 15.

Inspection Method of Optical Fiber Ribbon

Figure 7:
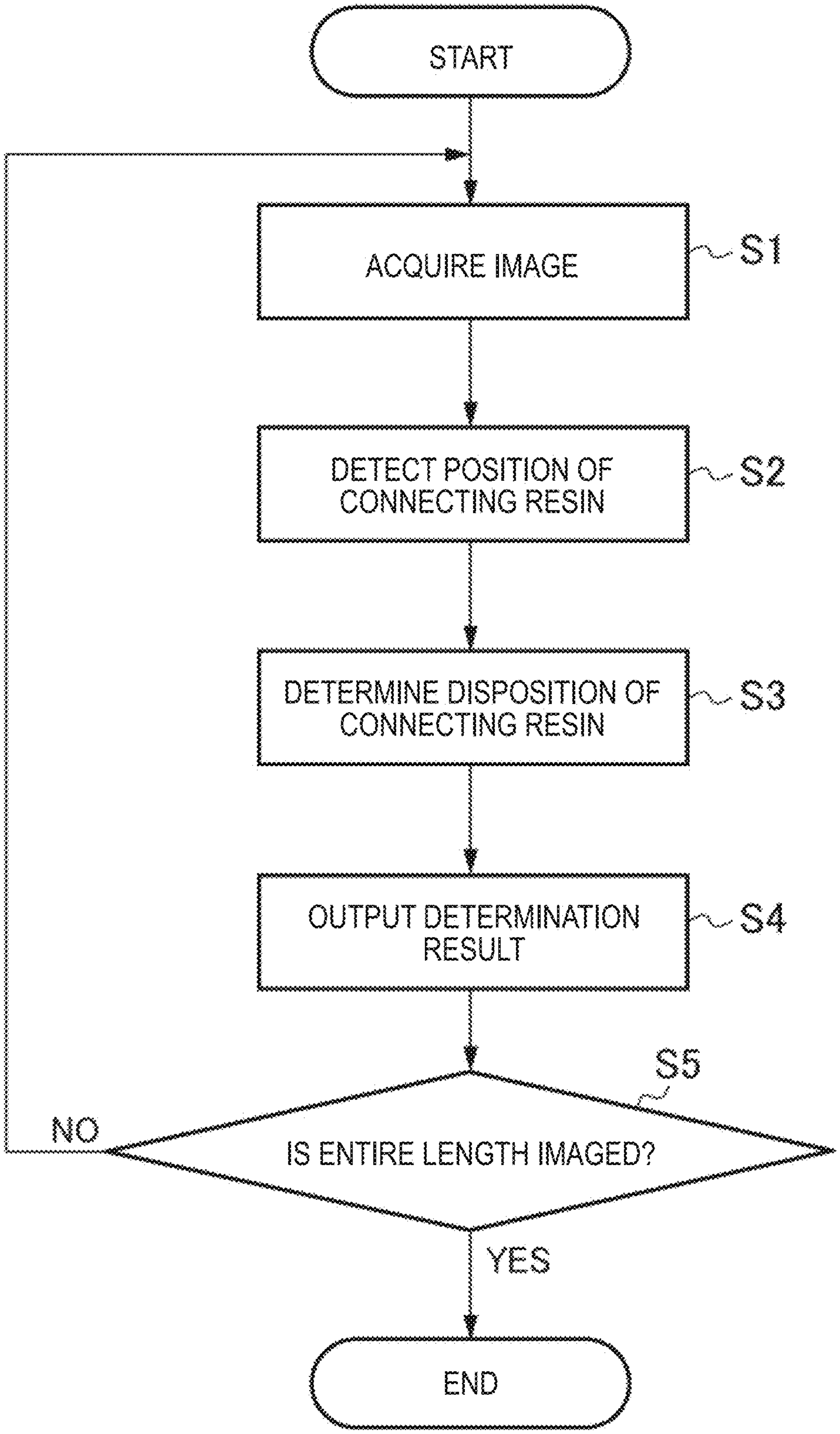
FIG. 7 is a flowchart illustrating an inspection method of the optical fiber ribbon.

Next, an inspection method of the optical fiber ribbon 1 using the inspection device 10 will be described using FIGS. 7 to 11. FIG. 7 is a flowchart illustrating the inspection method of the optical fiber ribbon 1.

First, the surface 1S of the optical fiber ribbon 1 where the connecting resin 3 is provided is irradiated with light from the light source 11 while causing the optical fiber ribbon 1 to travel in the longitudinal direction, and the imaging device 12 acquires an image based on reflected light that is emitted from the light source 11 and reflected from the surface 1S of the optical fiber ribbon 1 where the connecting resin 3 is provided (STEP 1).

Next, the camera control device 13 detects the position of the connecting resin 3 based on the image of the optical fiber ribbon 1 acquired from the imaging device 12 (STEP 2).

Figure 8:
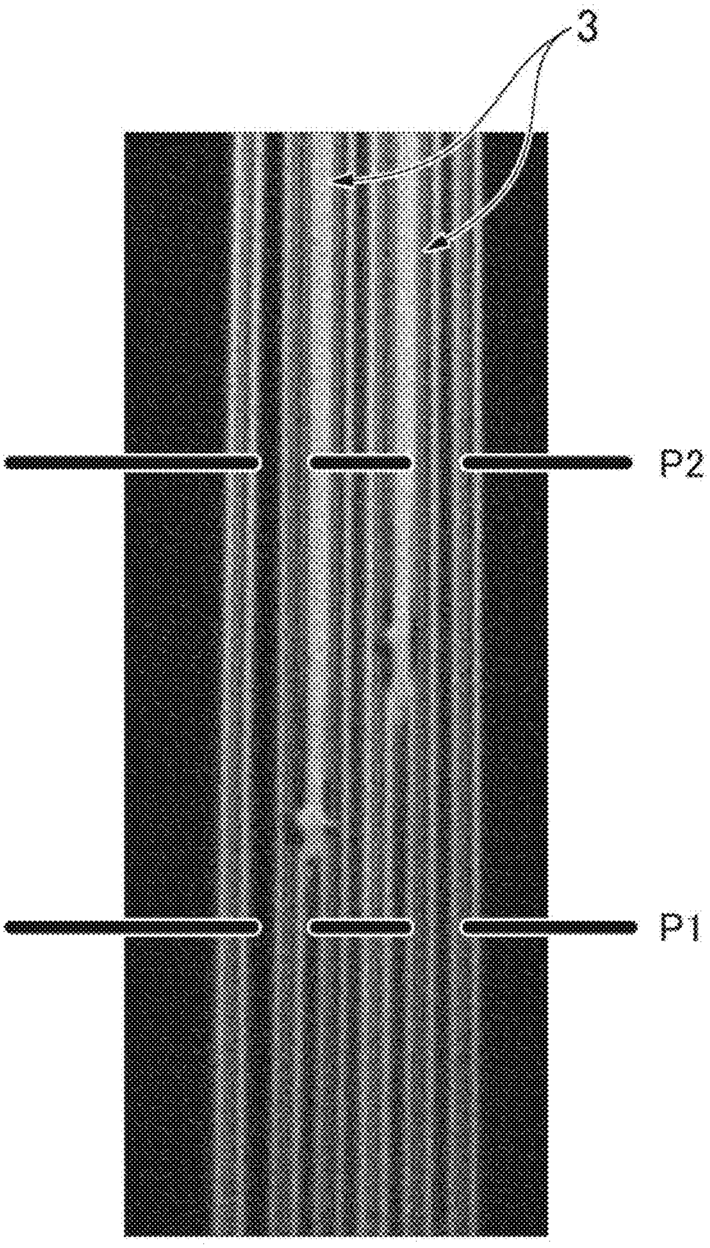
FIG. 8 is a diagram illustrating an image of the optical fiber ribbon in a region of the optical fiber ribbon indicated by a two-dot chain line in FIG. 2.
Figure 9:
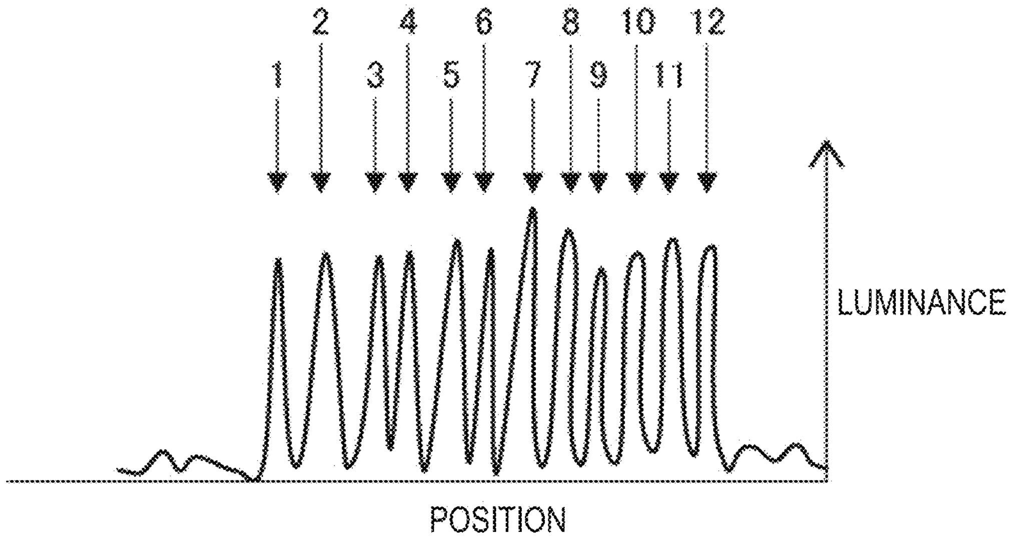
FIG. 9 is a luminance distribution along a width direction of the optical fiber ribbon at a position P1 of the image illustrated in FIG. 8.
Figure 10:
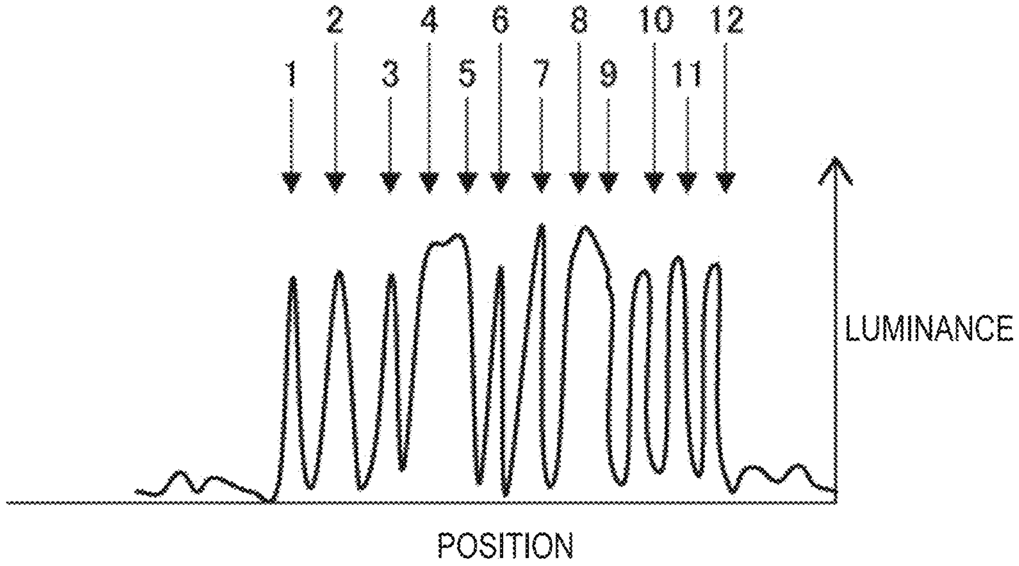
FIG. 10 is a luminance distribution along the width direction of the optical fiber ribbon at a position P2 of the image illustrated in FIG. 8.

For example, FIG. 8 illustrates the image of the optical fiber ribbon 1 acquired by imaging a region X of the optical fiber ribbon 1 indicated by a two-dot chain line in FIG. 2. FIG. 9 is a luminance distribution (reflected light intensity distribution) along the width direction of the optical fiber ribbon 1 at a position P1 of the image illustrated in FIG. 8. FIG. 10 is a luminance distribution (reflected light intensity distribution) along the width direction of the optical fiber ribbon 1 at a position P2 of the image illustrated in FIG. 8.

In the optical fibers 21 adjacent to each other, a shape of a surface of the optical fiber ribbon 1 varies between a portion where the connecting resin 3 is present and a portion where the connecting resin 3 is not present. In the portion where the connecting resin 3 is present, the intensity of reflected light locally increases. Specifically, in the surface 1S of the optical fiber ribbon 1 where the connecting resin 3 is provided, the connecting resin 3 is formed on a depression between the optical fibers 21 adjacent to each other. Therefore, the intensity of light reflected from the depression decreases, and the intensity of light reflected from the connecting resin 3 formed on the depression increases.

For example, as illustrated in FIG. 9, in the luminance distribution in the width direction of the optical fiber ribbon 1 at the position P1 of the optical fiber ribbon 1 where the connecting resin 3 is not formed, the luminance values at portions corresponding to the first to twelfth optical fibers 21 are high, and the luminance value between the optical fibers 21 adjacent to each other is low.

For example, as illustrated in FIG. 10, in the luminance distribution in the width direction of the optical fiber ribbon 1 at the position P2 of the optical fiber ribbon 1 where the connecting resin 3 is formed, the luminance values at portions corresponding to the optical fibers 21 are high, and the luminance value between the optical fibers 21 adjacent to each other where the connecting resin 3 is not formed is low. Further, the luminance value between the optical fibers 21 adjacent to each other where the connecting resin 3 is formed (the fourth and fifth optical fibers 21 or the eighth and ninth optical fibers 21) is high.

Accordingly, based on the reflected light intensity in the image of the optical fiber ribbon 1, the camera control device 13 detects the position of each of the optical fibers 21, and determines that a portion having a higher intensity of reflected light between the optical fibers 21 adjacent to each other than forward and backward portions is a portion where the connecting resin 3 is formed.

Figure 11:
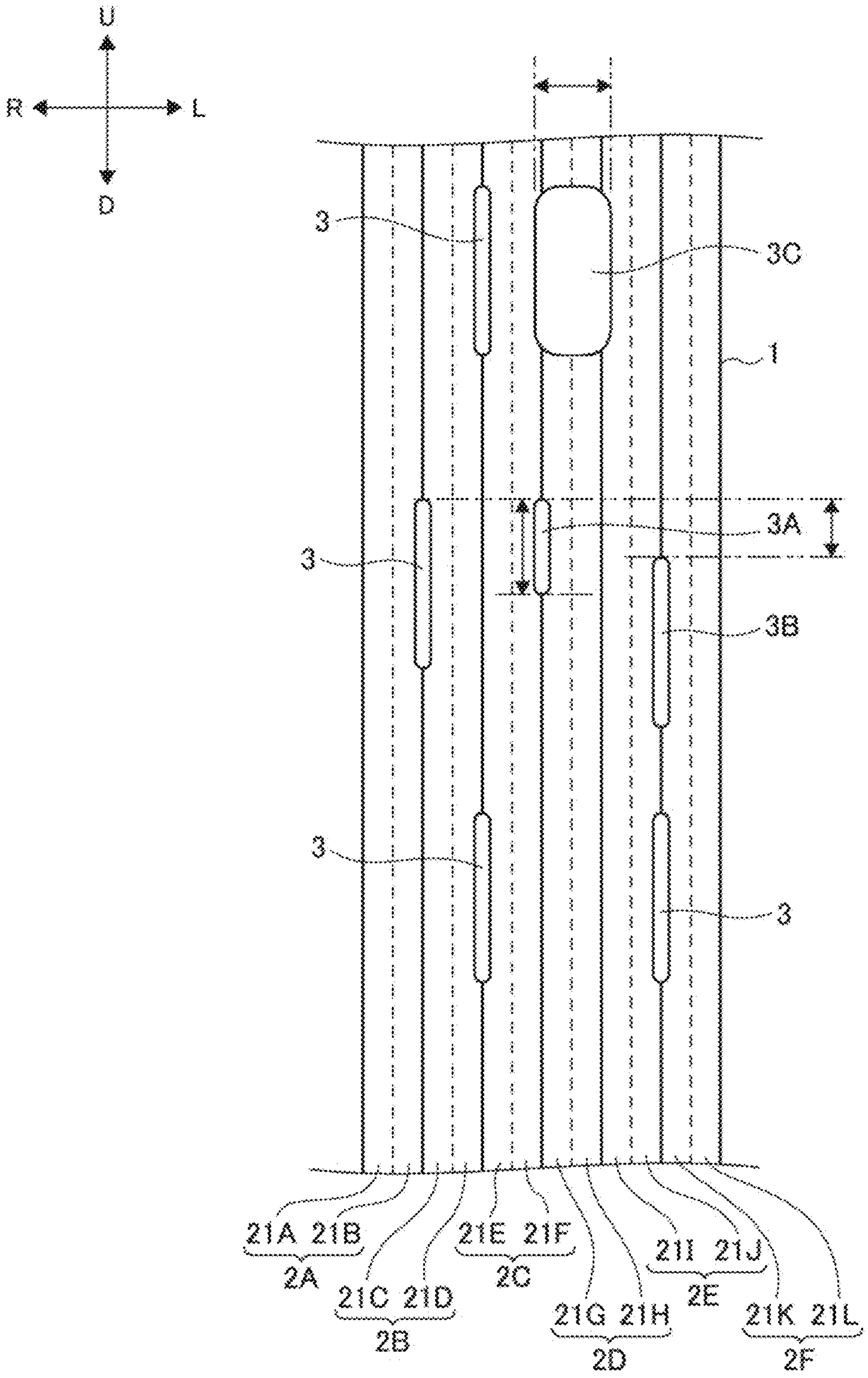
FIG. 11 is a diagram illustrating the optical fiber ribbon when a position of a connecting resin is not in a predetermined range.

Next, the camera control device 13 determines whether the detected position of the connecting resin 3 is normal (STEP 3). Specifically, the camera control device 13 determines whether the disposition, the size, and the shape of the connecting resin 3 are in the predetermined ranges based on the position of the portion where the connecting resin 3 is determined to be present. As a result, for example, as illustrated in FIG. 11, the camera control device 13 can detect a connecting resin 3A where the length in the longitudinal direction of the optical fiber ribbon 1 is short, a connecting resin 3B where the position in the longitudinal direction deviates, or a connecting resin 3C where the length in the width direction of the optical fiber ribbon 1 is long.

Next, the camera control device 13 outputs the determination result of the position of the connecting resin 3 to the display device 14 and the storage device 15 (STEP 4 in FIG. 7). The determination result of the position of the connecting resin 3 is displayed by the display device 14 and is recorded by the storage device 15. The determination result of the position of the connecting resin 3 includes, for example, the image of the optical fiber ribbon 1 or position information of the connecting resin 3 deviating from predetermined range.

The camera control device 13 repeats the processes of STEP 1 to STEP 4 until the entire length of the optical fiber ribbon 1 is imaged (NO in STEP 5). On the other hand, when the entire length of the optical fiber ribbon 1 is imaged (YES in STEP 5), the camera control device 13 ends the process.

In the inspection device 10 and the manufacturing method of the optical fiber ribbon 1 according to the present embodiment, the connecting resin 3 is detected using the image based on the reflected light. Therefore, even when the connecting resin 3 is transparent, an image having a high contrast of reflected light between the portion where the connecting resin 3 is present and the portion where the connecting resin 3 is not present can be acquired. As a result, the position of the connecting resin 3 can be accurately detected.

In addition, in the present embodiment, when the overlapping width $\alpha$ [mm] of imaging ranges imaged before and after the imaging period T is set to a constant, the imaging period T is changed depending on the traveling speed V of the optical fiber ribbon 1 such that a relational expression of $T=(L-\alpha)/(V/60)$ is satisfied. As a result, the overlapping width of the images acquired before and after the imaging period T is fixed. Therefore, even when the traveling speed V of the optical fiber ribbon changes, the color and the position of the connecting resin are easily specified.

The overlapping width $\alpha$ is set such that, for example, a relational expression of $0.1<\alpha/L<0.5$ is satisfied. When $\alpha/L$ is 0.1 or less, there may be a deviation between the traveling speed of the optical fiber ribbon 1 used when the imaging period T is acquired during an increase or a decrease in the traveling speed of the optical fiber ribbon 1 and the actual traveling speed of the optical fiber ribbon 1. At this time, there may be an interval where imaging is not executed. On the other hand, when $\alpha/L$ is 0.5 or more, the i-th imaging range Ri and the i+2-th imaging range R(i+2) overlap each other such that an increase in the traveling speed of the optical fiber ribbon 1 is unnecessarily limited.

Although the present invention has been described in detail with reference to specific embodiments, it will be apparent to those skilled in the art that various changes and modifications can be made without departing from the spirit and scope of the invention. In addition, the numbers, positions, shapes, and the like of the components described above are not limited to those of the embodiments and can be changed to numbers, positions, shapes, and the like suitable for implementing the present invention.

In the above-described embodiment, the camera control device 13 determines the imaging period T of the imaging device 12. However, the imaging device 12 may be configured to determine the imaging period T. In this case, the imaging device 12 may be configured to acquire information regarding the traveling speed of the optical fiber ribbon 1 from the camera control device 13 or the winding-up machine 36.

In the above-described embodiment, the sub-ribbon 2 is formed by integrating two optical fibers 21. However, the sub-ribbon 2 may be formed by integrating three or more optical fibers 21.

In the above-described embodiment, the sub-ribbons 2 adjacent to each other are intermittently connected in the longitudinal direction through the connecting resin 3. However, the single-core optical fibers 21 adjacent to each other may be intermittently connected in the longitudinal direction through the connecting resin 3 without forming the sub-ribbon 2.

In the above-described embodiment, the inspection device 10 is configured to inspect the optical fiber ribbon 1 traveling along the vertical direction. However, the inspection device 10 may be configured to inspect the optical fiber ribbon 1 traveling along the horizontal direction.

In the above-described embodiment, the display device 14 and the storage device 15 may be configured to be integrated with the camera control device 13.

In the above-described embodiment, the camera control device 13 may be integrated with the intermittent application control device that controls the operation of the manufacturing device 30 of the optical fiber ribbon 1.

In the above-described embodiment, the number of the optical fibers 21 configuring the optical fiber ribbon 1 is 12. However, the number of the optical fibers 21 is not limited.

In the above-described embodiment, the inspection by the inspection device 10 may be incorporated into the manufacturing steps of the optical fiber ribbon 1. However, the inspection by the inspection device 10 may be executed alone. Alternatively, the inspection by the inspection device 10 may be incorporated into a step of executing any treatment on the optical fiber ribbon 1, for example, a marking process step of marking the optical fiber ribbon 1.

What is claimed is:

1. An inspection method of an optical fiber ribbon where a plurality of optical fibers are intermittently connected in a longitudinal direction through a connecting resin in a state where the optical fibers are arranged in parallel, the inspection method comprising:

a step of irradiating a surface of the optical fiber ribbon where the connecting resin is provided with light from a light source while causing the optical fiber ribbon to travel in the longitudinal direction, and causing an imaging device to acquire an image based on reflected light that is emitted from the light source and reflected from the surface; and a step of detecting a position of the connecting resin based on the image, wherein an imaging period T [ms] of the imaging device is set such that the imaging period T, a length L [mm] of an imaging range in the longitudinal direction of the imaging device, and a traveling speed V [m/min] of the optical fiber ribbon satisfy a relational expression of $T<L/(V/60)$.

2. The inspection method of the optical fiber ribbon according to claim 1, further comprising a step of determining whether the detected position of the connecting resin is normal.

3. The inspection method of the optical fiber ribbon according to claim 1, wherein when an overlapping width $\alpha$ [mm] in the longitudinal direction of imaging ranges imaged before and after the imaging period T is set to a constant, the imaging period T is changed depending on the traveling speed V of the optical fiber ribbon such that a relational expression of $T=(L-\alpha)/(V/60)$ is satisfied.

4. The inspection method of the optical fiber ribbon according to claim 1, wherein the imaging device is disposed such that a first angle between the surface and incidence light emitted from the light source and incident on the surface and a second angle between the surface and reflected light reflected from the surface and incident on the imaging device are the same.

5. The inspection method of the optical fiber ribbon according to claim 4, wherein the second angle is 25° or more and 35° or less.

6. The inspection method of the optical fiber ribbon according to claim 1, wherein in the step of detecting the position of the connecting resin, an intensity of reflected light between two optical fibers adjacent to each other is greater than an intensity of reflected light in a forward and backward of connection resin of the two optical fibers in the longitudinal direction.

7. The inspection method of the optical fiber ribbon according to claim 1, wherein the optical fiber ribbon includes a plurality of sub-ribbons each of which includes two optical fibers and a coating resin that continuously covers a periphery of the two optical fibers in the longitudinal direction, and in a state where the sub-ribbons are arranged in parallel, the sub-ribbons adjacent to each other are intermittently connected to each other in the longitudinal direction through the connecting resin.

8. A manufacturing method of an optical fiber ribbon, comprising the inspection method of the optical fiber ribbon according to claim 1.

9. An inspection device of an optical fiber ribbon where a plurality of optical fibers are intermittently connected in a longitudinal direction through a connecting resin in a state where the optical fibers are arranged in parallel, the inspection device comprising:

a light source configured to irradiate a surface of the optical fiber ribbon where the connecting resin is provided with light, the optical fiber ribbon traveling in the longitudinal direction;

an imaging device configured to acquire an image based on reflected light that is emitted from the light source and reflected from the surface; and a control device configured to detect a position of the connecting resin based on the image, wherein an imaging period T [ms] of the imaging device is set such that the imaging period T, a length L [mm] of an imaging range in the longitudinal direction of the imaging device, and a traveling speed V [m/min] of the optical fiber ribbon satisfy a relational expression of $T<L/(V/60)$.

10. The inspection device of the optical fiber ribbon according to claim 9, wherein the control device determines whether the detected position of the connecting resin is normal.

11. The inspection device of the optical fiber ribbon according to claim 9, wherein the imaging device is disposed such that a first angle between the surface and incidence light emitted from the light source and incident on the surface and a second angle between the surface and reflected light reflected from the surface and incident on the imaging device are the same.

12. The inspection device of the optical fiber ribbon according to claim 11, wherein the second angle is 25° or more and 35° or less.

13. The inspection device of the optical fiber ribbon according to claim 9, wherein the control device determines that an intensity of reflected light between two optical fibers adjacent to each other is greater than an intensity of reflected light in a forward and backward of connection resin of the two optical fibers in the longitudinal direction.

* * * * *